3,209,874
FLUID-MECHANICAL POWER TRANSMISSION SYSTEM
George Foster, Wenonah, and James J. Donnelly, Cinnaminson, N.J., assignors to Socony Mobil Oil Company, Inc., a corporation of New York
Filed Nov. 9, 1962, Ser. No. 236,668
14 Claims. (Cl. 192—58)

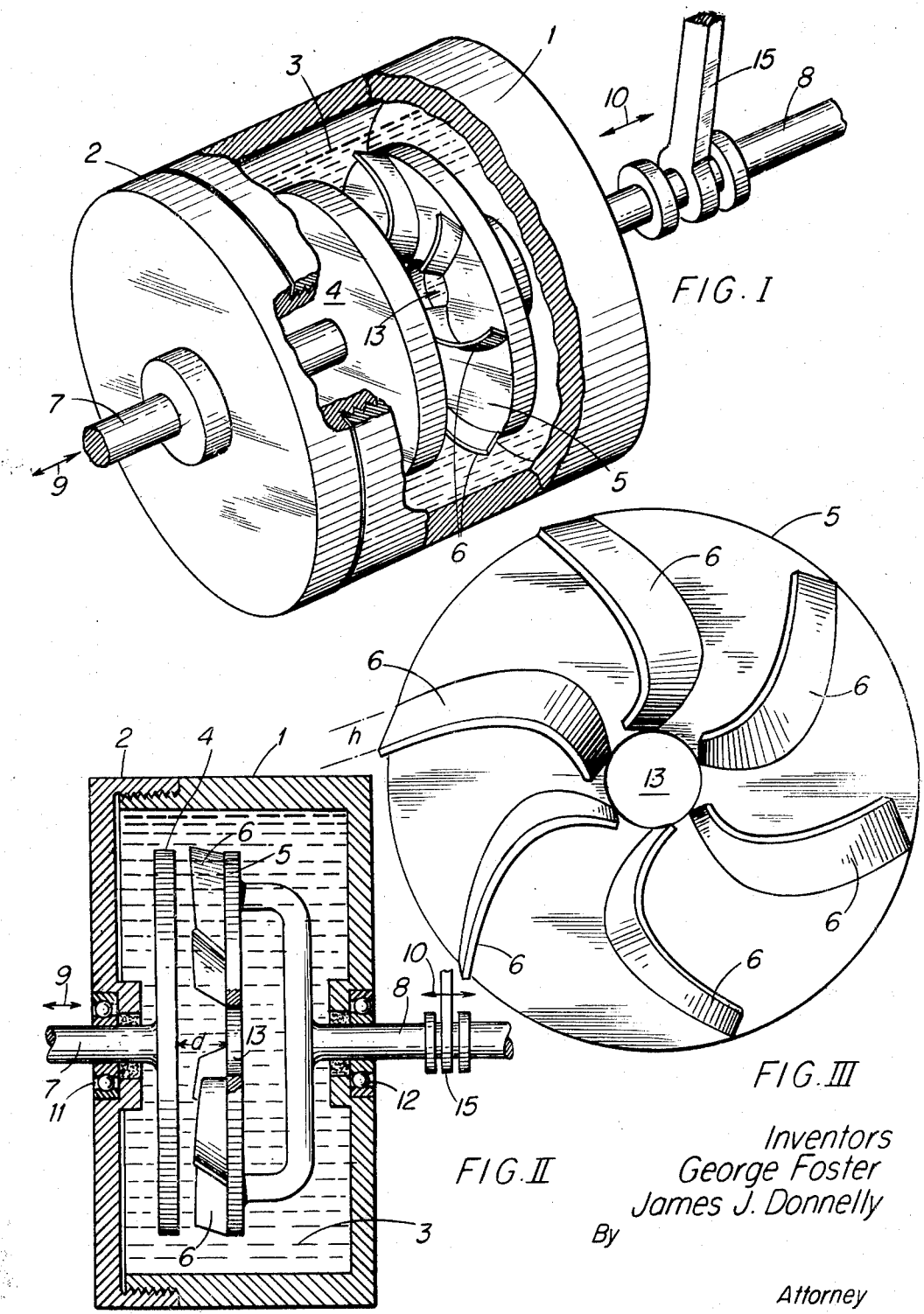

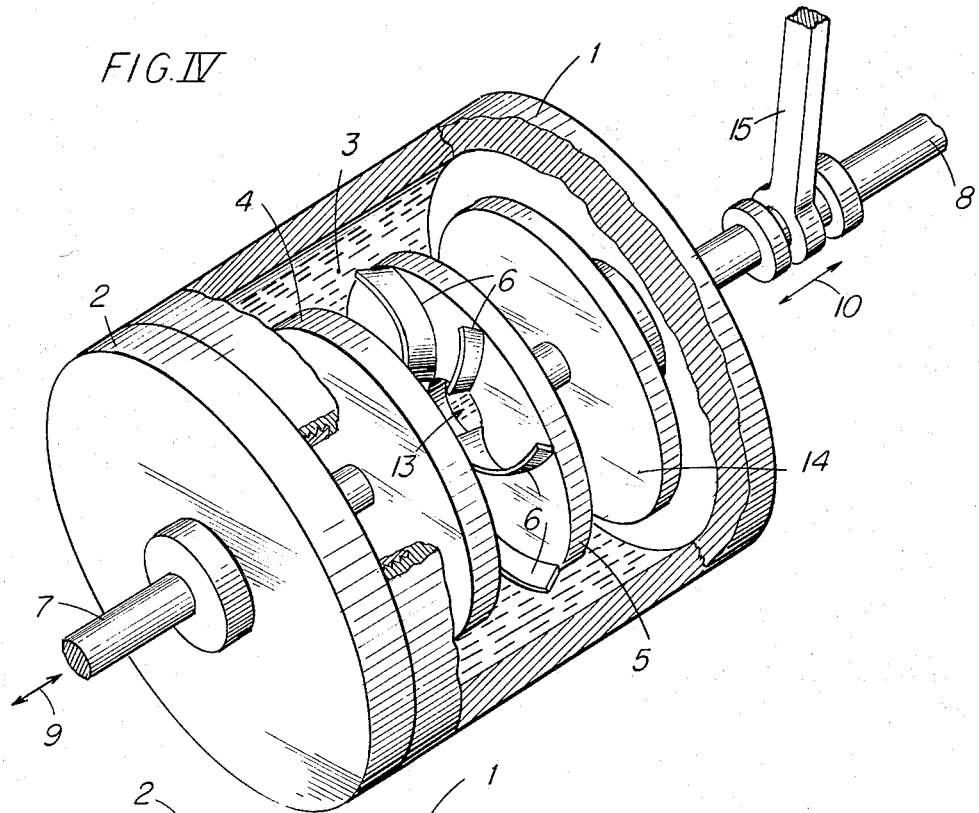
FIG. IV
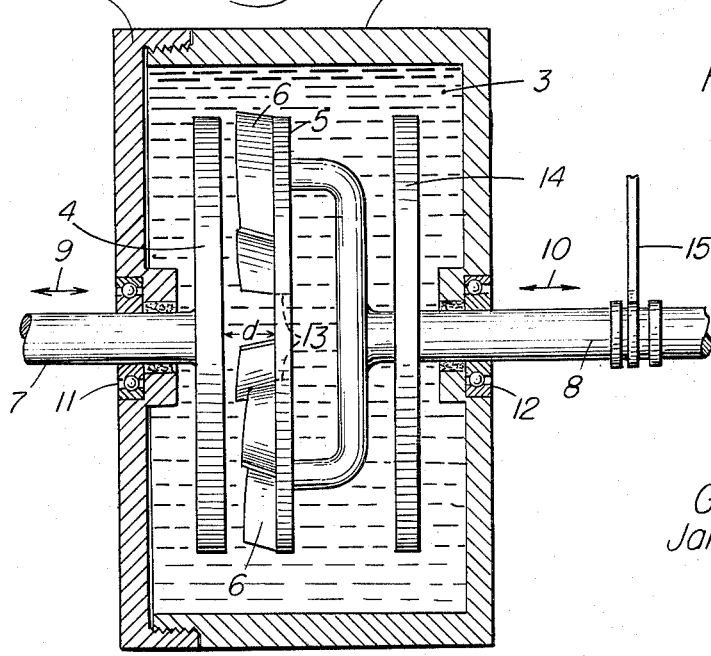
FIG. V
Inventors
George Foster
James J. Donnelly
Attorney

This invention relates to torque converters, couplings, variable speed drives, etc., which are of the fluid-mechanical power transmission system type.

The use of fluid-mechanical power transmission systems in these fields are well known to those skilled in the art. For example, in one such known type of transmission system utilized as a fluid coupling there is provided a driving torus or impeller and a driven torus or runner which are immersed in a fluid. The tori are provided with radial vanes or blades and are arranged to face each other. In operation, the driving torus is rotated causing the impeller vanes to impart a rotary motion to the fluid. Centrifugal action causes the fluid to be forced radially outward from the impeller vanes which are designed with a predetermined curvature to direct the expelled fluid to the openings between the runner vanes of the driven torus. There thus results a fluid circulation from the impeller to the runner at the periphery and back to the center of the impeller. The fluid is rotating at close to impeller speed as it passes into the runner and applies a torque effect to the latter. As the impeller speed increases, this torque increases until it becomes sufficient to rotate the runner with its connected load.

In fluid torque converters of the prior art, an additional member generally referred to as a reaction member is provided and comprises a stationary set of guide vanes arranged between the impeller and runner. The effect of the guide vanes is to change the torque between the driving torus and driven torus.

As is well known to those skilled in the art, the fluids utilized in the fluid-mechanical power transmission systems of the prior art are of a viscous Newtonian type which when set into rotation develops centrifugal forces, and the impeller of the prior art devices is equipped with vanes, as mentioned hereinbefore, to provide such centrifugal forces by setting such a fluid into rotation. As a consequence, the advantages of fluid-mechanical power transmission in the prior art are limited by the difficulties inherent in manipulation of the rotational speed of such fluids. For example, with a transmission fluid of the prior art type, the impeller must impart through its rotation a considerable amount of work in order to create in such a fluid a centrifugal force sufficient to initiate the rotation of the runner. Furthermore, the impeller in such a transmission system must be made to rotate at an appreciable angular velocity in order to provide in such a fluid the centrifugal force necessary to cause the runner to begin rotating. These limitations on the efficiency of power transmission by the centrifugal force of a rotating fluid result to a large degree from the inertia of the transmission fluid and the slippage which is experienced between the fluid and the tori of a fluid-mechanical coupling. Another consequence of the use of a Newtonian fluid in the transmission systems of the prior art is that the impeller of such systems must in all cases be provided with vanes to set the fluid in rotation, thereby contributing to the expenses and complexity of systems which could operate with the desired results without dependence on a centrifugal force in the fluid.

An object of this invention is to provide an improved fluid-mechanical power transmission system having a simpler and less expensive mechanical structure. Another object of this invention is to provide a fluid-mechanical power transmission system which can be made to respond more quickly and more efficiently to changes in the power input to the transmission system.

Accordingly, this invention features a fluid-mechanical power transmission system utilizing a viscoelastic, i.e. a non-Newtonian or Weissenberg fluid as a power transmission medium. In general, this invention relates to a fluid-mechanical power transmission system comprising a rotatable drive member, a rotatable driven member having an aperture therein, a viscoelastic fluid disposed between said drive member and said driven member and which liquid provides a force when said drive member is rotated, said driven member being further characterized in comprising means responsive to said force to rotate said driven member. More particularly, in such a system the fluid provides, when said drive member is rotated, a force normal to the shear stress exerted in said fluid by rotation of the drive member and the driven member comprises means responsive to said force to rotate the drive member.

As is well known to those skilled in the art, when a fluid is placed in contact with a solid rotating member, shear stresses are exerted in the fluid, and when such fluid is a viscoelastic, i.e. a non-Newtonian or Weissenberg fluid, there result at each point of shear stresses in the fluid forces normal to the direction of shear at such point, i.e. a force which is normal to the direction of shear and centripetal with respect to the rotation of the solid member and also a force which is normal to the direction of shear and parallel to the axis of rotation of the solid member. Briefly, the fluid-mechanical power transmission system of this invention utilizes the forces which develop in the viscoelastic fluid when the drive member is rotated to provide the torque which causes the rotation of the driven member.

The above-mentioned and other features of this invention will become more apparent by reference to the following description taken in conjunction with the accompanying drawings, in which:

FIG. I is a perspective view, partly cut away, illustrating a fluid-mechanical power transmission system embodying the teachings of this invention;

FIG. II is a cross-sectional view of the apparatus shown in FIG. I as viewed along the center axis of the chamber member;

FIG. III is a perspective view illustrating in greater detail the annular member shown in FIG. I.

FIG. IV is a perspective view, partly cut away, illustrating a more specific embodiment of this invention; and FIG. V is a cross-sectional view of the apparatus shown in FIG. IV as viewed along the center axis of the chamber member.

Referring to FIGS. I–III, a chamber member illustrated by way of example as comprising a hollow right circular cylindrical body 1 and screw-top cover assembly 2 adapted to contain a viscoelastic fluid 3. As mentioned before, the class of fluids to which this invention relates is one in which shear stresses caused by a rotating solid member result in forces normal to the direction of shear, such forces being centripetal with respect to such rotation and/or parallel to the axis of such rotation. Such fluids include, for example, solutions or suspensions of polyisobutylene and polymethacrylate polmers in organic solvents, polyethylene oxide and carbomethoxy cellulose in aqueous solution, aluminum salts of fatty acids in hydrocarbon solvents as well as many others.

Immersed in the fluid 3 is a rotatable drive member illustrated in the drawings as a drive plate or disk 4. As illustrated, drive plate 4 has a flat surface, but this element may be scored, roughened, or provided with other means which facilitate the transmission of power to the fluid 3. Also immersed in the fluid 3 is a rotatable driven member or plate having an aperture therein and illustrated in the drawings as comprising an annular member 5. The means by which the driven member is responsive to the force provided by the fluid to rotate the driven member is illustrated by way of example as a radial vane assembly associated with the driven member and comprising a plurality of vanes 6. However, it is to be understood that alternatively the radial vane assembly may be an element separate from but suitably connected to the driven member 5, or the driven member 5 may have instead of the radial vane assembly any other means responsive to the force provided by the fluid to rotate the driven member 5. The drive plate 4 and the annular driven member 5 are affixed to shafts 7 and 8, respectively, as shown. The distance $d$ between the drive plate 4 and the annular driven member 5 is made adjustable by displacement, for example of the shaft 7 and/or the shaft 8 as illustrated by the direction of the arrows 9 and 10 in FIG. II and FIG. V. Shafts 7 and 8 are adapted to rotate in suitable bearings 11 and 12 and are also provided with suitable packing assemblies, not shown, in a manner well known to those skilled in the art to prevent the leakage of fluid 3 from the assembly 1. Adjustment of distance $d$ may be achieved by a yoke 15.

As start-up begins the drive plate or disk 4 is rotated via the shaft 7 and the driven plate or member 5 is stationary. The fluid 3 becomes sheared between drive plate 4 and annular member 5 and develops forces centripetal to and forces parallel to the axis of rotation of drive plate 4. As a result, the fluid 3 is forced inward toward and along the axis of rotation of drive plate 4 and then through the aperture 13 of the annular driven member 5. The centripetal and axial forces exerted by the moving fluid on the vanes 6 of the driven member 5 develops a torque effect on the driven member 5 having a magnitude dependent on the angular velocities of the drive plate 4 and the driven member 5, the distance $d$ between the drive plate 4 and the driven member 5, the curvature characteristics of the radial vane assembly connected to the driven member 5, and the characteristics of the transmission fluid 3. As a consequence of this torque, the driven member 5 and its shaft 8 commence to rotate. As the difference in angular velocity of the driving and driven members decreases, the shear stress and consequently the forces developed normal to it decrease.

Thus, there are at least two possible ways to operate the system at a constant rate of power transmission. In one such way the driven member 5 and its shaft 8 are rotated at an angular velocity smaller than that of the drive plate or member 4 and its shaft 7 in which case the fluid 3 would still be sheared and a considerable portion of the power transmission would be via the centripetal and axial forces developed in the fluid 3. In this case, the fluid transmission system would be suitable for torque converter applications and the like, such as for example in a power transmission system for gas or steam turbine driven equipment where speed reduction may be desired at operating speed.

In another possible way to operate the system at a constant rate of power transmission, the angular velocity of the drive plate 4 and driven member 5 are substantially equal in which case the shearing of the fluid and the resulting centripetal and axial forces would be negligible but the centrifugal forces and viscous forces developed by the fluid 3 would then be sufficient to transmit power by means provided therefor from the drive plate to the driven member. In these cases, the fluid transmission system could act as a fluid coupling and the like, such as for example in automobiles or in electrically driven compressors where a direct drive may be desired at operating speed.

As will be obvious to those skilled in the art, the design of the means by which the driven member 5 is responsive to the centripetal and axial forces in the fluid, as for example the vanes 6, has much to do with the efficiency and the torque multiplication factor of the power transmission system.

By adjusting the distance $d$ between the drive plate or disk 4 and the driven member 5, the shear stresses exerted on the fluid 3 are varied, thereby changing the magitude of the centripetal forces and axial forces that are developed. By this adjustment the fluid-mechanical transmission system of this invention can be utilized, for example, as a variable speed drive device.

As the motion of the transmission fluid 3 causes the driven member 5 to rotate, such rotation exerts shear stress on the fluid disposed on the side of the driven member 5 opposite the drive plate 4 and causes thereby in such fluid forces which are centripetal and forces which are parallel with respect to the axis of rotation of the driven member 5 in the same manner that such forces result between the drive plate 4 and the driven member 5 from the rotation of the drive plate 4. Obviously, centripetal forces in the fluid 3 disposed at the outlet side of the aperture 13 in the driven member 5 through which fluid must flow to enable the rotation of the driven member 5 would to some degree tend to oppose such flow of fluid from the outlet of the aperture 13 and the rotation of the driven member 5. To overcome this tendency, there is included in an embodiment of this invention a rotatable third member 14 as shown in FIGS. IV and V, disposed at some distance from the driven member 5 and in a direction from the driven member 5 substantially opposed to the direction of the drive member 4 from the driven member 5.

Thus, as the driven member 5 is rotated according to the principle of this invention, the rotation of the third member 14 in the same angular direction enables a more ready rotation of the body of fluid disposed between the driven member 5 and the third member 14 and thereby averts the development therein of shear stresses as great as those which would result without the inclusion of the rotatable third member 14. The smaller shear stresses in such fluid cause smaller centripetal forces than would otherwise develop therein and therefore a lesser tendency of such centripetal forces to oppose the flow of transmission fluid 3 from the outlet side of aperture 13 in normal operation of the system and the rotation of the driven member 5. Accordingly, an embodiment of this invention comprises a fluid-mechanical power transmission system comprising a series of spaced-apart, substantially coaxial members, the first of which comprises a rotatable drive member, the second a rotatable driven member having an aperture therein, and the third a rotatable member, a viscoelastic fluid disposed between said drive member and said driven member and between said driven member and said third member and which provides, when said drive member is rotated, a force normal to the shear stress exerted in said fluid by the rotation of said drive member, said driven member being further characterized in comprising means responsive to said force to rotate said driven member.

It is to be noted and understood that the elements of the fluid-mechanical transmission system of this invention have been described and illustrated herein as being arranged and shaped in a symmetrical manner by way of example and for the purpose of clarity only. Thus, for example, the drive plate 4 and the driven member 5 are illustrated as being symmetrical about their respective center axis and the entire system is substantially symmetrically arranged about the center axis of the cylindrical assembly 1. However, as is obvious to those skilled in the art, other arrangements and/or modifications to the elements of the system are possible without departing from the scope of this invention.

Therefore, while we have described above the principles of our invention in connection with specific apparatus, it is to be clearly understood that this description is made by way of example only and not as a limitation to the scope of our invention as set forth in the objects thereof and in the accompanying claims.

We claim:
1. A fluid-mechanical power transmission system comprising a rotatable drive member, a rotatable driven member having an aperture therein, a viscoelastic fluid disposed between said drive member and said driven member and which fluid provides a force normal to the shear stress exerted in said fluid when said drive member is rotated, said driven member being further characterized by comprising means responsive to said force to rotate said driven member.

2. A fluid-mechanical power transmission system comprising a series of spaced-apart members, the first of which comprises a rotatable drive member, the second a rotatable driven member having an aperture therein, and the third a rotatable member, a viscoelastic fluid disposed between said drive member and said driven member and between said driven member and said third member and which fluid provides a force normal to the shear stress exerted in said fluid when said drive member is rotated, said driven member being further characterized in comprising means responsive to said force to rotate said driven member.

3. A transmission system, as defined in claim 2, wherein said three members are spaced apart, substantially ca-axially disposed disc-like members.

4. A fluid-mechanical transmission system comprising a rotatable substantially flat drive plate, a rotatable substantially flat driven plate having an armature therein, vane-like members associated with said driven plate, a viscoelastic fluid disposed between said drive plate and said driven plate to provide a force normal to the shear stress exerted in said fluid when said drive plate is rotated, said vane-like members being responsive to said force to rotate said driven plate.

5. A fluid-mechanical transmission system according to claim 4 further comprising means to adjust relatively the distance between said drive plate and said driven plate.

6. A fluid-mechanical transmission system comprising a disk adapted to be rotated about the center axis of said disk, an annular member adapted to be rotated about the center axis of said annular member, a plurality of radial vane-like members associated with said annular member, and a viscoelastic fluid disposed between said disk and said annular member to provide a force normal to the shear stress exerted in said fluid when said disk is rotated, said vanes being responsive to said force to rotate said annular member.

7. A fluid-mechanical transmission system according to claim 6 further comprising means to adjust relatively the distance between said disk and said annular member.

8. A fluid-mechanical transmission system for transmitting power from a rotatable first shaft to a rotatable second shaft, said system comprising a disk substantially symmetrically disposed about the axis of rotation-of and coupled-to said first shaft, an annular member substantially symmetrically disposed about the axis of rotation-of and coupled-to said second shaft, said annular member having a plurality of radial vanes disposed thereon and substantially facing said disk, and a viscoelastic fluid disposed between said disk and said annular member to provide a force for transmitting said energy from said first shaft to said second shaft when said first shaft is rotated, said vanes being adapted to coact with said force to rotate said second shaft.

9. A fluid-mechanical transmission system according to claim 8 further comprising means to adjust relatively the distance between said disk and said annular member.

10. A fluid-mechanical transmission system comprising a chamber member having a viscoelastic fluid contained therein, a first rotatable shaft having one end portion thereof disposed in said chamber, a second rotatable shaft having one end portion thereof disposed in said chamber, a disk coupled in a substantially symmetrical manner to said one end portion of said first shaft, and an annular member coupled in a substantially symmetrical manner to said one end portion of said second shaft, said annular member having a plurality of radial vanes disposed on said annular member and substantially facing said disk, said viscoelastic fluid being adapted to be disposed between said disk and said annular member when said first shaft is rotated to provide a force to coact with said vanes to rotate said second shaft.

11. A fluid-mechanical transmission system according to claim 10 further comprising means to adjust relatively the distance between said disk and said annular means.

12. A fluid-mechanical transmission system according to claim 10 wherein said vanes are adapted to coact with a force, provided by said viscoelastic fluid and substantially centripetal with respect to the axis of rotation of said disk, to rotate said second shaft.

13. A fluid-mechanical transmission system according to claim 10 wherein said vanes are adapted to coact with a force, provided by said viscoelastic fluid and substantially parallel to the axis of rotation of said disk, to rotate said second shaft.

14. A fluid-mechanical power transmission system comprising a rotatable drive plate, a rotatable driven plate, vane-like members associated with said driven plate, a viscoelastic fluid disposed between said drive plate and said driven plate to provide a force normal to the shear stress exerted in said fluid when said drive plate is rotated, said driven plate having an aperture that permits passage therethrough of viscoelastic fluid flowing from between said drive plate and said driven plate, which flow is directed by said force, and said vane-like members being responsive to said flow of said visco-elastic fluid to rotate said driven plate.

References Cited by the Examiner

UNITED STATES PATENTS

| Re. 25,481 | 11/63 | Weir. |
| 2,342,414 | 2/44 | Magill. |
| 2,361,385 | 10/44 | Day. |
| 2,706,547 | 4/55 | Ranzi. |
| 2,775,317 | 12/56 | Sinisterra _____ 188—101 |
| 2,863,542 | 12/58 | Kelsey. |

FOREIGN PATENTS

| 711,430 | 6/54 | Great Britain. |

OTHER REFERENCES

Silicone Putty, Product Engineering, January 1950, pp. 90, 91, 92, 93.

Silicone Putty, Product Engineering, October 1953, pp. 142–143.

DAVID J. WILLIAMOWSKY, *Primary Examiner.*

UNITED STATES PATENT OFFICE
CERTIFICATE OF CORRECTION

Patent No. 3,209,874 October 5, 1965

George Foster et al.

It is hereby certified that error appears in the above numbered patent requiring correction and that the said Letters Patent should read as corrected below.

Column 5, lines 23 and 24, for "çaaxially" read -- coaxially --; line 28, for "armature" read -- aperture --.

Signed and sealed this 31st day of May 1966.

(SEAL)
Attest:

ERNEST W. SWIDER
Attesting Officer

EDWARD J. BRENNER
Commissioner of Patents